United States Patent [19]

Stoffel

[11] Patent Number: 5,126,086
[45] Date of Patent: Jun. 30, 1992

[54] METHOD FOR PRODUCING A CONTAINER HAVING AN INSIDE BAG

[75] Inventor: Gerd Stoffel, Constance, Fed. Rep. of Germany

[73] Assignee: Lechner GmbH, Rielasingen, Fed. Rep. of Germany

[21] Appl. No.: 586,452

[22] Filed: Sep. 21, 1990

[30] Foreign Application Priority Data

Sep. 22, 1989 [DE] Fed. Rep. of Germany ....... 3931624

[51] Int. Cl.⁵ .............................................. B29C 41/04
[52] U.S. Cl. .................................. 264/130; 264/155; 264/270
[58] Field of Search ............... 264/269, 130, 270, 311, 264/155

[56] References Cited

U.S. PATENT DOCUMENTS

| | | | |
|---|---|---|---|
| 2,898,972 | 8/1959 | Strong | 264/269 |
| 3,318,985 | 5/1967 | Turner et al. | 264/269 |
| 3,666,528 | 5/1972 | Barnhardt | 264/270 |
| 3,691,269 | 9/1972 | Robinson et al. | 264/255 |
| 3,885,016 | 5/1975 | Pivar | 264/270 |
| 4,198,365 | 4/1980 | Pelton | 264/249 |
| 4,230,659 | 10/1980 | Sutch | 264/130 |
| 4,293,353 | 10/1981 | Pelton et al. | 156/294 |
| 4,865,787 | 9/1989 | Vallance et al. | 264/101 |

FOREIGN PATENT DOCUMENTS

| | | |
|---|---|---|
| 2360319 | 6/1975 | Fed. Rep. of Germany . |
| 330516 | 6/1930 | United Kingdom . |
| 1455453 | 11/1976 | United Kingdom . |

Primary Examiner—Jan H. Silbaugh
Assistant Examiner—Brian J. Eastley
Attorney, Agent, or Firm—Bachman & LaPointe

[57] ABSTRACT

A method for producing a container having an inside bag for the accommodation of a filling material w which is applied by a propellant between the container and the inside bag from a valve or the like, wherein after production of the container, for example by pressing, deep drawing or the like, its interior is provided with an inside protective lacquer and subsequently primed. Thereupon, plastic for the inside bag is injected into the container and the container having the inside bag is subsequently subjected to heat to remove superfluous solvent from the plastic. Then a bottom hole is shaped out for the later introduction of the propellant. After injection of the plastic, the container is placed in an oven and rotated therein for a lengthy period.

4 Claims, No Drawings

METHOD FOR PRODUCING A CONTAINER HAVING AN INSIDE BAG

BACKGROUND OF THE INVENTION

The invention relates to a method for producing a container having an inside bag for the accommodation of a filling material which is applied by a propellant between the container and the inside bag from a valve or the like. After production of the container, for example by pressing, deep drawing or the like, its interior is provided with an inside protective lacquer and subsequently primed. Plastic for the inside bag is injected upon the primer and subsequently the container having the inside bag is subjected to heat to remove superfluous solvent from the plastic. A bottom hole is then shaped out in the container for the later introduction of the propellant.

A dual-chamber container of this type is known, for example, from German Offenlegungsschrfit No. 2,360,319.

In that case, the material for the inside bag is applied as a coating, for example by applying the liquid coating material into the pressure vessel through a nozzle. Afterwards the Pressure vessel is turned over so that the superfluous liquid can flow out. Another possibility of coating is introduction by means of a spray head lowered into the interior of the container, the spray head or the pressure vessel itself being rotated in order to guarantee even coating.

However, these methods have proved to be disadvantageous in that the coating or the inside bag is deformed again during the subsequent heating to evaporate the superfluous solvent, due to the fact that the material of the inside bag flows together and air or solvent inclusions are formed which lead to undesired irregularities in the inside bag. Due to these inclusions, the inside bag can even become leaky.

Furthermore, for reasons of cost and production, PVC (polyvinyl chloride) is used in practice for the production of the inside bag. However, a plasticizer must be added to this PVC material so that the inside bag can be folded properly. The plasticizer, in turn, has the disadvantage that it merges into the filling material and the corresponding container is therefore not suitable for foodstuffs, pharmaceuticals or the like. Additionally, when recycling PVC, hydrochloric acid arises which, in turn, considerably impairs the environment.

SUMMARY OF THE INVENTION

The inventor's aim was to develop a method of the abovementioned type, in which these disadvantages have been eliminated, in which case, in particular, an environmentally friendly inside bag is to be produced which is, as far as possible, of homogeneous design.

This object is achieved in accordance with the present invention in that after injection the present invention provides a method for producing a container having an inside bag for the accommodation of a filling material which is applied by a propellant between the container and the inside bag, which comprises providing the interior of the container with an inside protective lacquer, providing a primer on the lacquer, injecting plastic for the inside bag on the primer, and subsequently subjecting the container having the inside bag to heat to remove superfluous solvent from the plastic, wherein, after injection of the plastic, the container is placed in an oven and is rotated therein.

DETAILED DESCRIPTION

The filling material between the container and the inside bag is applied from a valve or the like. The container is prepared by pressing, deep drawing or the like. After application of the inside bag, a bottom hole is shaped out in the container for the later introduction of the propellant.

In accordance with the present invention after the injection of the plastic, the container is placed in an oven and is rotated therein for a lengthy period. This rotation in preferably a forced-air oven guarantees that no flowing together of the material of the inside bag takes place at a particular point of the container and that, no inclusions arise whether these be air or solvent inclusions. It has been shown in practice that a completely homogeneous inside bag is obtained in accordance with the present invention which has a thickness of, for example, 80–120 um.

It has been established in practice that a rotation over a period of at least 2 minutes at 140°–200° C. is sufficient to produce the desired homogeneous inside bag.

Polyolefins or mixtures with polyolefins are preferably used for the production of the inside bag. In contrast to PVC, polyolefin can readily be eliminated when recycling the container since polyolefin burns away almost completely and no undesired environmental pollution takes place. Further environmentally friendly plastics can also be used.

In accordance with the production method according to the present invention, the inside bag adapts completely to the inside space or the inside contours of the container. Therefore, difficulties could result in the production of the bottom hole to the extent that the introduction of the punch for the bottom hole causes damage to the inside bag. However, a further feature of the present invention prevents this disadvantage, namely that the bottom hole is only punched to the extent that the slug is only removed when charged with the pressure of the propellant. The punching produces a sort of intended separation point, the bottom, however, not being completely punched through but only being quite considerably weakened at this point.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for producing a container having an inside bag for the accommodation of a filling material which is applied by a propellant between the container and the inside bag, which comprises providing the interior of the container with an inside coating, followed by injecting plastic with an injection means for the inside bag in the interior of the container, and subsequently subjecting the container having the inside bag to heat to remove superfluous solvent from the plastic, wherein, after injection of the plastic, the container is placed in an oven and is rotated therein for at least two minutes at 140°–200° C. such that no flowing together of the plastic of the inside bag takes place at a particular point of the container and such no air or solvent inclusions arise, thereby obtaining a homogeneous inside bag having a thickness of 80-120 um.

2. The method of claim 1 wherein said plastic contains polyolefin.

3. The method of claim 1 wherein a separation point for a bottom hole comprising a scribed circle is shaped in the container for the introduction of propellant after heating and said circle is shaped only to the extent that a slug is only removed to form said bottom hole when charged with the pressure of the propellant.

4. The method of claim 1 including the step of shaping a bottom hole in the container for introduction of propellant after the heating step.

* * * * *